United States Patent [19]
Nishio et al.

[11] Patent Number: 5,853,849
[45] Date of Patent: Dec. 29, 1998

[54] BELT FOR FRICTIONALLY CONVEYING ARTICLES

[75] Inventors: Hiroyuki Nishio; Kazutoshi Ishida, both of Hyogo, Japan

[73] Assignee: Mitsuboshi Belting Ltd., Hyogo, Japan

[21] Appl. No.: 716,595

[22] Filed: Sep. 18, 1996

[30] Foreign Application Priority Data

Sep. 20, 1995 [JP] Japan ................................. 7-267801
Aug. 9, 1996 [JP] Japan ................................. 8-227464

[51] Int. Cl.⁶ .................. D06N 7/04; F16H 7/00; F16G 1/00
[52] U.S. Cl. ................. 428/143; 428/148; 428/149; 428/168; 428/331; 428/402; 474/84; 474/148; 474/205; 474/264; 474/268; 198/846
[58] Field of Search .................... 428/156, 167, 428/143, 148, 149, 168, 331, 402; 156/137; 474/268, 237, 205, 263, 264, 84, 148; 451/311; 198/846

[56] References Cited

U.S. PATENT DOCUMENTS

4,674,622  6/1987  Utsunomiya et al. ............... 198/500
5,405,299  4/1995  Kubo ................................ 474/205

*Primary Examiner*—Donald Loney
*Attorney, Agent, or Firm*—Wood, Phillips, VanSanten, Clark & Mortimer

[57] ABSTRACT

A belt for conveying articles, which belt has a body having a surface against which articles are placed to be frictionally held and thereby conveyed as the belt is advanced in operation. The belt body surface is defined by rubber and a porous filler in the rubber. The porous filler is present in the rubber in an amount of at least 5 parts by weight of porous filler per 100 parts by weight of rubber.

46 Claims, 4 Drawing Sheets

BELT FOR FRICTIONALLY CONVEYING ARTICLES

BACKGROUND OF THE INVENTION

1. Field of the Invention

This invention relates to belts and, more particularly, to a belt having a surface against which flat articles such as cards, bills, tickets, and the like can be placed to be frictionally held and thereby conveyed as the belt is advanced in operation.

2. Background Art

It is known to convey flat articles such as bills, tickets, cards, and the like in systems using endless, toothed belts. In one exemplary system, one belt is trained around spaced, upper, drive and driven pulleys. A second belt is trained around lower, spaced, drive and driven pulleys. The pulleys are arranged so that surfaces on the belts contact each other in a conveying zone. An article to be conveyed is interposed between the surfaces in the conveying zone so that the article simultaneously contacts both of the belt surfaces and is frictionally held thereby and conveyed as the belts are advanced in operation. A press roll is normally provided to urge the upper belt surface against the lower belt surface in the conveying zone with a variable force. Typically, these belts have a toothed drive side to cooperate with complementary surfaces on the pulleys so that positive advancement of the belts is effected.

Ideally, belts used in this type of system have a predetermined coefficient of friction that does not vary appreciably in a temperature range of −20° to 60° C. It is also desirable that the belts have the same flexibility in this temperature range. Further, the belts should resist abrasion and should not transfer any foreign material/dirt to the articles being conveyed. Still further, it is desirable that the belts advance at a constant rate and that they maintain their alignment with each other to precisely and consistently convey articles interposed therebetween.

It is known to construct such belts using chloroprene rubber. In a typical construction, the belt has a body with a plurality of teeth spaced regularly along the length thereof and load carrying cords embedded in the body. A cloth layer is placed over the teeth. A suitable cloth has an uncrimped thread to define warp yarns along the length of the belt made of nylon 6 or nylon 6,6 subjected to a crimping process, and weft yarns along the width of the belt made of nylon 6 or nylon 6,6. This cloth is subjected to an adhesion process using a resorcinol-formalin-latex solution (RFL solution) in order to cause a firm adherence of the cloth to the teeth on the belt. The cloth is then coated with rubber by a soaking or a spreading process.

With these prior belt constructions, oil and water applied to the article engaging surfaces of the belt tend to decrease the coefficient of friction. When the belt is made using rubber having a high resistance to oil, the oil adheres to the article contact surface but is not absorbed. As a result, the coefficient of friction is decreased, thereby adversely affecting the ability of the belt to frictionally convey articles. In the event a rubber that does not resist oil is used, the rubber absorbs the oil and swells. While the change in the coefficient of friction is less in this case than with an oil resistant rubber, the performance of the belt adversely changes because of a change in its dimensions resulting from the oil absorption.

A further problem with chloroprene rubbers used in this environment is that the coefficient of friction for the rubber may significantly decrease at low temperatures. It is therefore difficult to maintain a consistent coefficient of friction in the normal range of operating temperatures. In cold conditions, the decrease in the coefficient of friction is commonly compensated for by increasing the force produced on the upper belt by of the press roll.

However, increasing the press roll force causes other problems. By increasing the press roll force, a large tension may be applied to the belt, as a result of which the article engaging surface is prone to wear. Further, the load carrying cords embedded in the body tend to extend. To compensate for this, ongoing tension adjustments may have to be made to the press roll to maintain a relatively constant coefficient of friction. Also, the frame and supporting structure for the pulleys must be made durable enough to sustain the forces applied to the belt. This may necessitate additional expense in constructing the pulley supporting system.

SUMMARY OF THE INVENTION

The present invention makes possible the realizing of one or more of the following objectives. One objective is to provide a belt which is capable of consistently conveying articles such as cards, bills, tickets and the like in a wide temperature range. It is also an objective to maintain a predetermined coefficient of friction and good flexibility in this temperature range, even when oil and water are applied to the article engaging surface of the belt in use. Further, it is an objective of the present invention to allow articles to be engaged and frictionally conveyed without transferring any foreign material to the articles. It is also an objective of the invention to cause conveyance of articles precisely without any significant variation in speed or direction as the belts are operated.

In one form of the invention, a belt is provided for conveying articles, which belt has a body having a surface against which articles are placed to be frictionally held and thereby conveyed as the belt is advanced in operation. The belt body surface is defined by rubber and a porous filler in the rubber. The porous filler is present in the rubber in an amount of at least 5 parts by weight of porous filler per 100 parts by weight of rubber.

One advantage of this construction is that oil and water contacting the belt body surface can be absorbed so that the coefficient of friction of the belt body surface is not appreciably altered.

In one form, the porous filler is present in the rubber in an amount of no more than 80 parts by weight of porous filler per 100 parts by weight of rubber. In a more preferred form, the porous filler is present in the rubber in an amount between 20–80 parts by weight of porous filler per 100 parts by weight of rubber.

The porous filler may be an inorganic porous powder that is at least one of diatomaceous earth, zeolite, activated carbon, and silica gel. The powder may have particles with an average diameter of 10 $\mu$m to 30 $\mu$m.

The belt body has a length and an inside and an outside. The surface against which the articles are placed is on one of the inside and outside of the belt body. In one form, there are teeth spaced regularly in a lengthwise direction on the other of the inside and outside of the belt body.

The belt body surface may be formed by grinding which may be carried out by stretching the belt body, advancing the belt body, and grinding the belt body with the belt body stretched and advancing.

A cloth layer may be provided on the teeth. In one form, the cloth layer is a canvas treated only with a resorcinolformalin-latex solution. In one form, the canvas treated with the resorcinol-formalin-latex solution has a solid content of RFL of 30 to 50% by weight, determined by the following formula: % solid content of RFL=(weight of canvas after treatment−weight of untreated canvas)/(weight of untreated canvas)×100(%).

The cloth layer may further be defined by at least one of nylon 6, nylon 6,6, polyester, and aramid fiber.

The cloth layer may be at least one of a plain weave fabric, a twill fabric, and a satin fabric.

By treating the cloth layer, the rubber in the underlying teeth is not directly exposed through the openings in the canvas. As a result, passage of rubber powder through the canvas is avoided. Rubber powder could otherwise pass freely through the openings in the canvas and adhere to articles being conveyed.

The rubber defining the belt body surface can be chloroprene rubber with a good resistance to crystallization. The teeth can also be made from this same chloroprene rubber.

This chloroprene rubber resists crystallization even if it is left at a low temperature for a long period of time. As a result, hardening due to crystallization is avoided. As a consequence, the coefficient of friction of the belt is not lowered appreciably at low temperatures so that the conveying characteristics of the belt are not detrimentally altered.

The rubber defining the belt body surface and/or the teeth can further be at least one of nitrile rubber, hydrogenated nitrile rubber, natural rubber, ethylene-propylene terpolymer (EPT), styrene-butadiene rubber, butyl rubber, and chlorosulfonated polyethylene rubber.

The rubber may include a compounding agent that is at least one of carbon black, flowers of zinc, stearic acid, a plasticizer, and an antioxidant. The rubber may further include a vulcanizing agent that is at least one of sulfur and an organic peroxide.

The belt body may have a load carrying cord extending lengthwise over the entire length of the belt body. The cord in one form is defined by 5 to 9 $\mu$m filaments of at least one of E-glass and high strength glass treated with at least one of an RFL solution and a rubber composition. The load carrying cord may be defined by 0.5 to 2.5 denier filaments of para-aramid fiber treated with at least one of an RFL solution, an epoxy solution, and an isocyanate solution and a rubber composition.

The belt, described above, may be provided in combination with at least two spaced pulleys, with the belt being trained for advancement in a continuous path around the two pulleys.

The invention further contemplates the combination of a belt and pulleys, as previously described, with a second belt having a second body with a second surface against which articles are placed to be frictionally held and thereby conveyed as the second belt is advanced in operation. The second belt body surface is defined by rubber with a porous filler in the rubber. The porous filler is present in the rubber in the second belt an amount of at least 5 parts by weight of porous filler per 100 parts by weight of rubber. Third and fourth pulleys are provided around which the second belt is trained for advancement in a continuous path. The two spaced pulleys and third and fourth pulleys are arranged so that the belt body surfaces define a zone therebetween to accept flat articles that can be placed against the surfaces of the belt bodies to be frictionally held and thereby conveyed as the belts are advanced in the continuous paths.

In another form of the invention, a belt is provided for conveying articles, which belt has a body with a length, an inside and an outside. A load carrying cord extends lengthwise over the entire length of the body. The body has a surface on one of the inside and outside of the belt body against which articles are placed to be frictionally held and thereby conveyed as the belt is advanced in operation. Teeth are provided on the other of the inside and outside of the body spaced regularly along the length of the belt body. A cloth layer is provided on the teeth. The belt body surface is defined by rubber. A porous filler is provided in the rubber that defines the belt body surface and is present in an amount of at least 5 parts by weight of porous filler per 100 parts by weight of rubber.

DETAILED DESCRIPTION OF THE DRAWINGS

Figure 1:
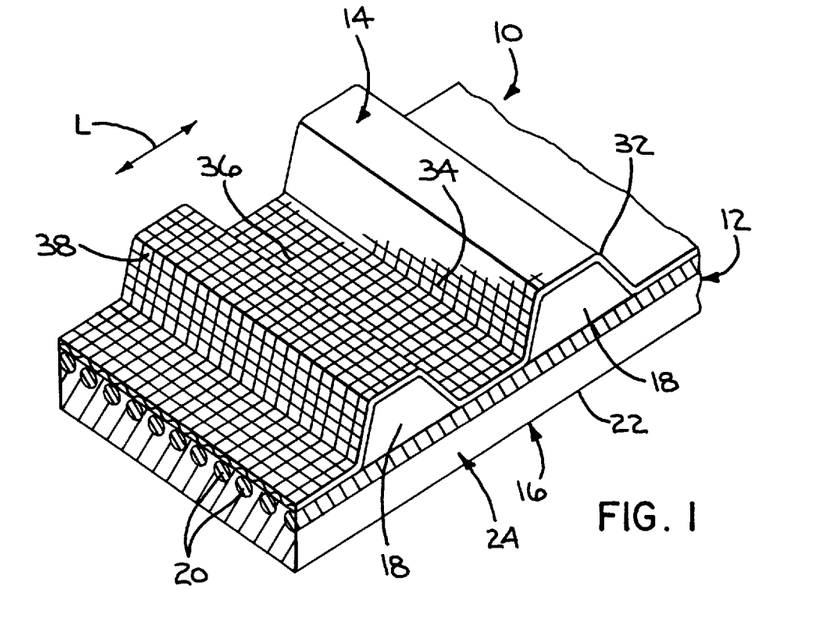
FIG. 1 is a fragmentary, perspective view of a belt for conveying articles according to the present invention.

In FIG. 1, a belt, according to the present invention, is shown at 10. The belt 10 has a body 12 with a length in the direction of the double-headed arrow L, an inside 14 and an outside 16. A plurality of teeth 18 extend laterally of the belt body 12 and are spaced regularly in a lengthwise direction on the inside of the belt body 12. Laterally spaced, load carrying cords 20 are embedded in the belt body and extend continuously over the entire length of the belt 10. The pitch between the teeth 18 is preferably not more than 3 mm as a result of which there is minimal variation in conveying speed and precise belt alignment in operation. The belt 10 has an outside surface 22 that can be used to engage and frictionally advance articles, as hereinafter described.

The teeth 18 and an outside body portion 24 are defined by a rubber composition that is at least one of chloroprene rubber, nitrile rubber, hydrogenated nitrile rubber, natural rubber, ethylene-propylene terpolymer (EPT), styrene-butadiene rubber, butyl rubber, chlorosulfonated polyethylene rubber, and the like.

Carbon black, flowers of zinc, stearic acid, a plasticizer, an antioxidant, and the like, can be added as a compounding agent to the above rubbers. A vulcanizing agent such as sulfur, or an organic peroxide, can be used. However, the compounding and vulcanizing agents are not limited to this.

It is desirable that the belt 10 have a destaticizing capability in use. The electric resistance value of the belt is adjusted to not more than 6 MΩ, depending on the quantity of carbon black, or the like, that is present.

Chloroprene rubber is a preferred component of the rubber defining the belt surface 22 and the teeth 18 because of its good resistance to crystallization. Chloroprene rubbers having adequate crystallization resistance are commercially available. However, it is desirable to use rubber whose hardness (JIS) is raised by not more than 10 when left at a temperature of 0° C. for 100 hours. Ideally, this change in hardness is zero.

It is preferred that the amount of chloroprene rubber with good crystallization resistance be not more than 40% by weight of the rubber composition in the belt teeth 18 and belt portion 24. However, this rubber can make up the entire rubber composition in the teeth 18 and the belt portion 24.

Chloroprene rubber having good resistance to crystallization resists hardening, even when left at low temperatures for prolonged periods. With this rubber in the belt portion 24 and the teeth 18, no significant hardness increase results from crystallization at low temperatures. At the same time the coefficient of friction does not decrease significantly at these low temperatures. This is a valuable feature of the belt 10 when it is incorporated into an article conveying system, as shown at 30 in FIG. 3, and described in greater detail hereinafter.

Porous filler is added to the rubber composition in the belt body 12. Preferably, the porous filler is an inorganic porous powder having an average particle diameter of 10 μm to 30 μm. Suitable powders include diatomaceous earth, zeolite, activated carbon, and silica gel. The amount of porous filler added to the rubber is preferably in the range of 5–80 parts by weight of filler per 100 parts by weight of rubber. More preferably, 20–80 parts by weight of filler are present per 100 parts by weight of rubber.

It has been found that when the amount of filler is less than 5 parts by weight, the absorption of oil and water is relatively small. On the other hand, when the filler is present in more than 80 parts by weight, the viscosity of the rubber composition is increased, as a result of which the quality of the teeth 18 is compromised during the formation process. If a softening agent is used to address this problem, abrasion resistance is decreased, as a result of which adhesive wear is liable to occur.

To expose the porous filler at the surface 22, so that the porous filler can effectively absorb oil and water applied thereto, the outside surface 22 is formed by grinding. In a preferred form, the belt is stretched after vulcanization between two pulleys and advanced while being operated upon by a grinder.

In a preferred form, the load carrying cords 20 are formed by twisting filaments of 5–9 μm of E-glass or high strength glass followed by treatment using an RFL solution, or the like, as a protective agent, or an adhesive made from a rubber composition. Alternatively, organic fiber can be used to define the load carrying cords 20 by twisting 0.5 denier to 2.5 denier filaments of para-aramid fiber. These fibers, such as those sold commercially under the trademarks KEVLAR® and TECHNORA®, resist stretching and have a high tensile strength. The fibers are treated using an adhesive that is an RFL solution, an epoxy solution, or an isocyanate solution, and a rubber composition. However, the invention should not be viewed as being limited to this type of load carrying cord 20.

A cloth layer 32 is applied on the inside 14 of the belt body 12. The cloth layer 32 is a canvas, which may be formed from one or a combination of nylon 6, nylon 6,6, polyester, and aramid fiber. The weft yarns 34 and warp yarns 36 are preferably a filament thread or a textile thread made from the above fibers. It is preferred that urethane elastic thread having good stretching properties be used in the warp yarns 36. The cloth layer 32 may be a plain weave fabric, twill fabric, or a satin fabric.

The cloth layer 32 is treated only with an RFL solution so that the solid content of the RFL solution after drying is between 30–50 weight percent. The solid content of the RFL solution includes an RF resin and a solid latex. The solid content percentage is determined by the following formula: (weight of the canvas after treatment−weight of untreated canvas)/(the weight of the untreated canvas)×100(%).

The RFL solution is obtained by mixing an initial condensation product of resorcinol and formalin with latex. The molar ratio of resorcinol to formalin is 1:1 to 3. Further, the weight percentage ratio of the initial condensation product of resorcinol and formalin to latex is 1:1 to 10.

The latex may be at least one of styrene-butadiene-vinylpyridine terpolymer, hydrogenated nitrile rubber, chlorosulfonated polyethylene, and epichlorohydrine.

To treat the cloth layer 32, the canvas is dipped in an RFL solution. The canvas is then squeezed between a pair of rolls at a pressure (gauge pressure) of approximately 0.3 to 0.8 kgf/cm and dried. The cloth is re-dipped in the same manner to adjust the solid content of RFL solution within the desired 30–50% weight range.

It has been found that when the solid content of the RFL solution is less than 30% by weight, the contact area between the warp yarns 36 and weft yarns 34 can shift relative to the tooth rubber, as a result of which the openings 38, defined cooperatively thereby, enlarge. This may expose rubber in the teeth 18. When the amount of solid content RFL solution is greater than 50%, the teeth 18 are less precisely shaped.

The inventive belt was tested together with comparative sample belts, as described below, to compare various performance characteristics. Three inventive belts and four comparative sample belts were constructed in accordance with Table 1, below.

TABLE 1

|  | Inventive Belts | | | Comparative Samples | | | |
| --- | --- | --- | --- | --- | --- | --- | --- |
|  | 1 | 2 | 3 | 1 | 2 | 3 | 4 |
| Chloroprene rubber S-40* | 100 | 100 | 100 | — | — | — | — |
| Chloroprene rubber M40** | — | — | — | 100 | 100 | — | 100 |
| Natural rubber | — | — | — | — | — | 30 | — |
| SBR | — | — | — | — | — | 40 | — |
| EPT | — | — | — | — | — | 30 | — |
| ZnO | 5 | 5 | 5 | 5 | 5 | 5 | 5 |
| MgO | 4 | 4 | 4 | 4 | 4 | — | 4 |
| Stearic acid | 1 | 1 | 1 | 1 | 1 | 1 | 1 |
| Carbon black | 40 | 40 | 40 | 40 | 40 | 40 | 40 |
| Diatomaceous earth | 20 | 40 | 60 | — | 40 | — | 4 |
| DDP | 10 | 10 | 10 | 10 | 10 | — | 10 |
| Naphthane oil | — | — | — | — | — | 10 | — |
| Antioxidant | 1 | 1 | 1 | 1 | 1 | 1 | 1 |
| Vulcanization accelerator 22 | 0.25 | 0.25 | 0.25 | 0.25 | 0.25 | — | 0.25 |

TABLE 1-continued

|  | Inventive Belts | | | Comparative Samples | | | |
| --- | --- | --- | --- | --- | --- | --- | --- |
|  | 1 | 2 | 3 | 1 | 2 | 3 | 4 |
| Vulcanization accelerator DM | — | — | — | — | — | 1 | — |
| Vulcanization accelerator TT | — | — | — | — | — | 0.25 | — |
| Sulfur | 1 | 1 | 1 | 1 | 1 | 2 | 1 |

*Chloroprene rubber "S-40" is manufactured by Denki Kagaku Kogyo K. K., and has good resistance to crystallization.
**Chloroprene rubber "M-40" is general, middle grade chloroprene rubber manufactured by Denki Kagaku Kogyo K. K. that is crystallizable.

The cloth layer on the teeth was obtained by weaving weft yarns of 140-denier nylon 6,6 and warp yarns of 280-denier nylon 6,6 and a 140-denier urethane elastic thread at a weft density of 180/5 cm and a warp density of 160/5 cm into a twill canvas. The canvas was vibrated in water to shrink the width of the canvas to approximately ½ of its size at time of weaving. The canvas was then dipped in an RFL solution as shown in Table 2, squeezed at a gauge pressure of 0.5 kgf/cm between a pair of rolls, and dried. The canvas was re-dipped in the same RFL solution, squeezed at the same pressure, and dried until the amount of solid content RFL solution was approximately 40% by weight. This percentage was determined by the following formula: (weight of the canvas after treatment−weight of the untreated canvas)/(weight of the untreated canvas)×100(%).

TABLE 2

| RFL compound | |
| --- | --- |
| resorcinol | 10.0 |
| formalin (37%) | 15.0 |
| caustic soda | 1.0 |
| VP latex | 400 |
| CF latex | 400 |
| Water | 1000 |
| Total | 1826.0 |

The load carrying cords were ECG-150-3/0, obtained by bundling filaments of glass fiber with a diameter of approximately 9 μm to form a strand. The strand was dipped in an RFL solution and dried at a temperature of 250° C. for two minutes. Three strands were then gathered and twisted four times per 10 cm to define the load carrying cord.

The cloth was formed into a cylindrical, endless shape and placed on a metal mold. A pair of glass fiber load carrying cords, S and Z, were alternatingly wound around the mold at a pitch of 0.5 mm while applying a tension of 0.9 kg. A rolled sheet, made from the rubber composition shown in Table 1, was wound around the glass fiber cords and vulcanized using an ordinary press fit procedure. The vulcanized sleeve was cut to predetermined widths, after which the article-engaging outside surface thereof was ground to produce a completed belt.

The tooth type was STPD, with 140 teeth at a pitch of 1.5 mm. The belt width was 6.4 μm. The shape of the teeth after molding was good. The rubber in the teeth was not exposed through the cloth layer. No rubber was present on the exposed surface of the cloth.

Testing

To evaluate the characteristics of the belts, the coefficient of friction, the electrical resistance value, the abrasion loss, the resistance to dirt development and adhesion, the brittleness due to temperature, the resistance to oil and water, and the number of times an article such as a card were drawn were then determined, with the results being shown in Table 3 below. The resistance to dirt adhesion, and the card drawing test are shown by indexes taking those in the comparative sample 1 as 100.

Coefficient of Friction

Figure 5:
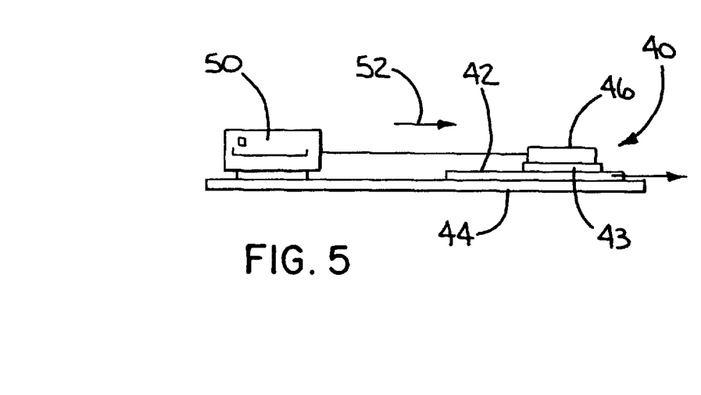
FIG. 5 is a schematic representation of a system for measuring the coefficient of friction of a belt surface.

The coefficient of friction was measured using a device such as that shown at 40 in FIG. 5. An article, in this case a telephone card 42, was placed on a base plate 44, with the magnetic surface of the card 42 facing upwardly. A toothed article conveying belt 43 was cut to a width of 6.4 mm and a length of 20 mm. The article engaging surface on the belt 43 was faced downwardly. A weight 46 of 100 gf (identified as "M") was placed on top of the belt 43 and connected to a spring balance 50 which exerted a force F on the weight 46 so that the telephone card 42 was moved at a speed of 300 mm per minute in the direction indicated by the arrow 52. The coefficient of fiction (calculated as F/M) was measured at 25° C., 0° C., and −35° C. For the inventive sample No. 2 and the comparative sample No. 2, the belts were left at a temperature of 0° C. for 100 hours.

Electrical Resistance Value

The electrical resistance value of the article engaging surface of the belt 43 was measured at an applied voltage of 500 volts by taking the distance between terminals as 50 mm on the article engaging surface of the belt 43.

Abrasion Loss

Figure 8:
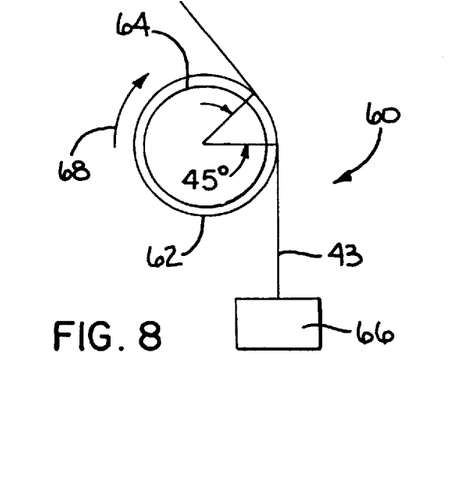
FIG. 8 is a schematic representation of a system for measuring abrasion resistance of a belt.

Abrasion loss was measured by a system as shown at 60 in FIG. 8, wherein the belt 43 was used to wind XEROX® paper 62 around the outer periphery of a roll 64 having a 65 mm diameter. The upper end of the belt 43 was fixed. A weight 66 was mounted on the lower end of the belt 43. The weight was 0.4-kgf. The roll 64 was rotated in the direction of the arrow 68 at a speed of 15 rpm for 2 hours.

Resistance to Dirt

Figure 7:
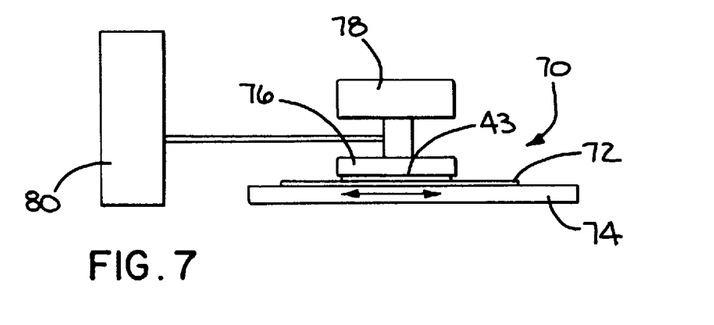
FIG. 7 is a schematic representation of a system for testing the amount of development and adhesion of dirt to articles conveyed by a belt.

Resistance to dirt was measured using a system as shown at 70 in FIG. 7. A telephone card 72 impregnated with ethanol was mounted on a movable stand 74. The belt 43 was cut to a width of 6.4 mm and a length of 20 mm and mounted on the bottom of a pressing plate 76 which was loaded with a 500-gf weight 78. The toothed inside of the belt 43 was faced downwardly. The pressing plate 76 was fixed to a stationary base 80. The movable stand 74 was advanced a distance 40 mm at a speed of 300 mm/second in 30 reciprocating movements. The card 72 was observed to determine whether dirt adhered thereto.

A similar test was conducted using a 1000 yen bill.

A further test was conducted to determine the resistance to dirt adhesion, using a wet nylon canvas. The nylon canvas was impregnated with ethanol and the back surface thereof rubbed using the above-identified equipment 30 times. The presence or absence of dirt adhesion was determined after the belt test.

Dried nylon canvas was also tested for resistance to dirt adhesion. The above type of equipment was used with the nylon canvas being rubbed against the toothed surface of the belt 43 thirty times.

Resistance to Oil and Water

Figure 2:
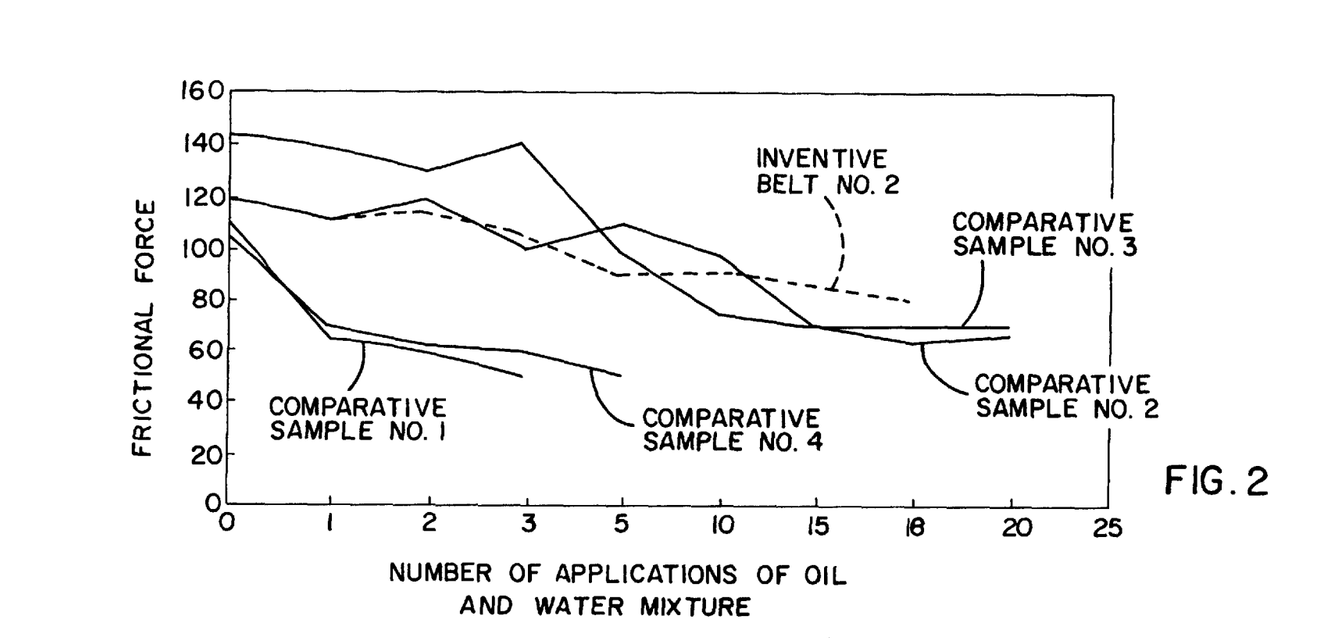
FIG. 2 is a graph showing the relationship between the number of applications of an oil and water mixture and the frictional force developed by an article engaging surface on various inventive and comparative sample belts.
Figure 6:
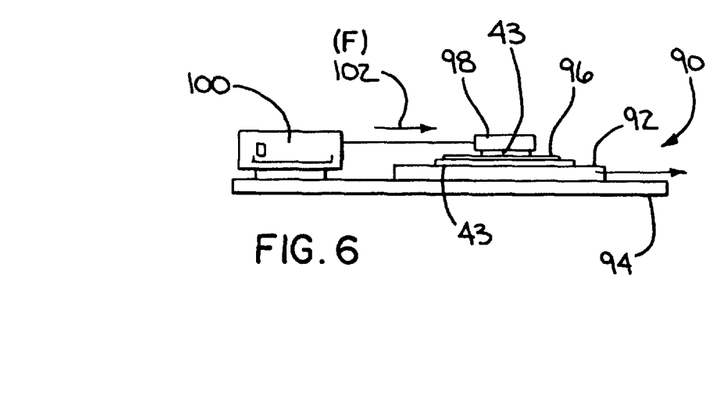
FIG. 6 is a schematic representation of a system for testing the resistance of a belt to oil and water.

Resistance to oil and water was measured using a system as shown at 90 in FIG. 6. A movable stand 92 was placed on a base plate 94. The belt 43 was cut to a width of 4.4 mm and length of 100 mm and placed on the movable stand 92 with the article engaging surface facing upwardly. A telephone card 96 with its magnetic surface directed upwardly was placed on the toothed belt 43. A second belt 43, cut to a width of 4.2 mm and a length of 25 mm, was placed on top of the telephone card 96 with the article engaging surface of the belt 43 directed downwardly. A weight 98 (500 gf) was applied on the upper belt 43. 5 grams of an oil and water combination were mixed with 180 cc of ethanol. The mixture was agitated and its solid content was separated by using filter paper. The resulting liquid solution was applied to the magnetic surface of the telephone card. A spring balance 100 was used to apply a force in the direction of the arrow 102 on the weight 98 sufficient to cause the movable stand 92 to advance at a speed of 300 mm per minute. This force (F) was used as a frictional force. The solution was continuously re-applied and the system tested after each application. The changes in the frictional force relative to the number of applications of the solution are shown in FIG. 2.

Card Drawing Test

Figure 3:
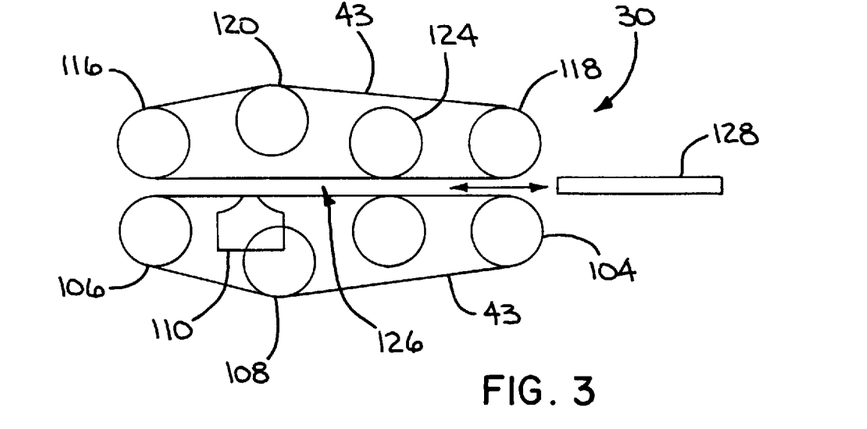
FIG. 3 is a side elevation view of a system for conveying flat articles incorporating two cooperating belts, made according to the present invention.
Figure 4:
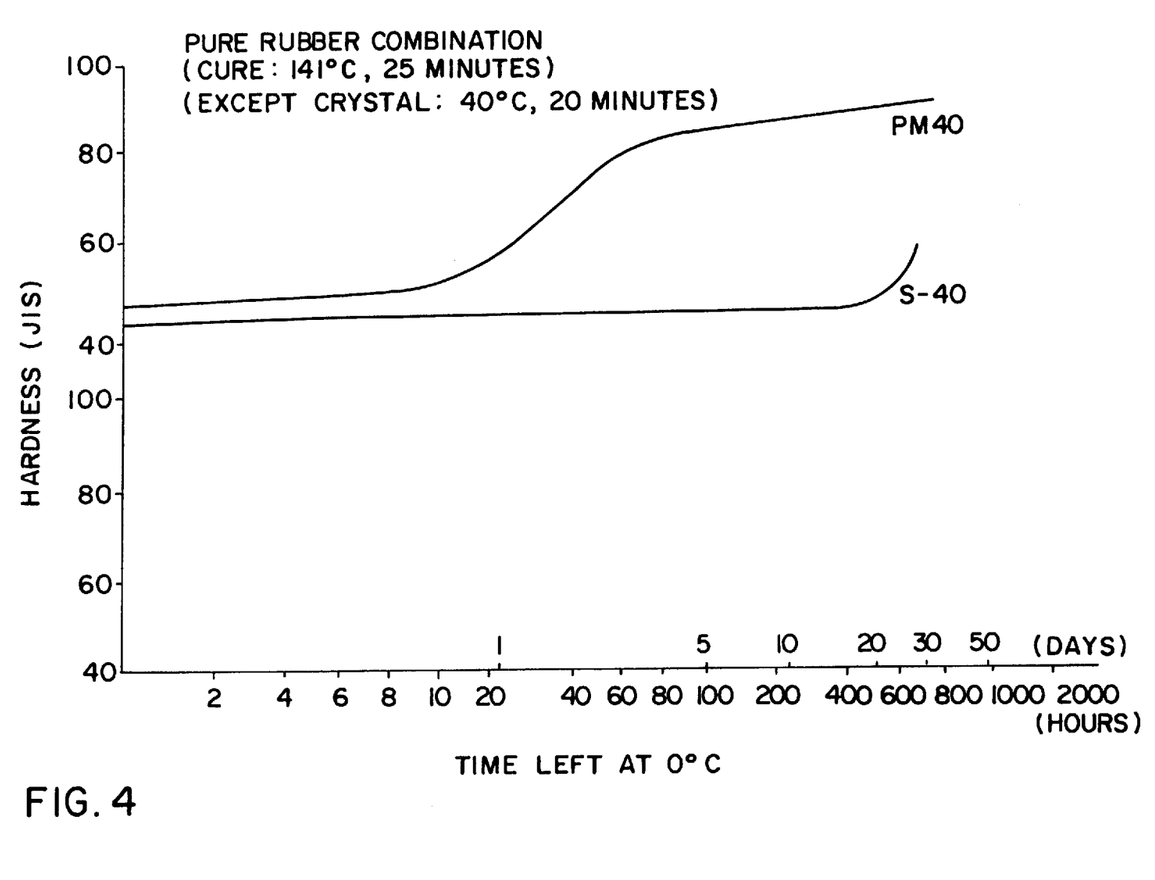
FIG. 4 is a graph showing the relationship between the hardness of various inventive and comparative sample belts, and the length of time for which the belts are maintained at 0° C.

In the system 30 in FIG. 3, one belt 43 was trained continuously around a lower drive pulley 104 and a driven pulley 106 to move in a continuous path therearound. An idler pulley 108 and a magnetic head 110 were located between the pulleys 104, 106.

An upper driven belt 43 was trained around and tensioned between spaced press rolls 116, 118 to move in a continuous path therearound. A tensioning pulley 120 and a press roll 124 were located therebetween. A load of 500 gf was applied to each of the press rolls 116, 118, 124 so that the upper driven belt 43 and the lower driving belt 43 were brought into contact with each other in a conveying zone 126.

A prepaid card 128 was interposed between the belts 43 in the zone 126. The card 128 was moved to the magnetic head 110 to read a magnetic signal, after which the card 128 was directed to outside of the apparatus 30.

The results of the various above tests are shown in Table 3, below.

TABLE 3

|  | Inventive Belts | | | Comparative Samples | | | |
| --- | --- | --- | --- | --- | --- | --- | --- |
|  | 1 | 2 | 3 | 1 | 2 | 3 | 4 |
| coefficient of friction | | | | | | | |
| 25° C. | 1.10 | 1.23 | 1.20 | 0.85 | 1.22 | 1.30 | 1.10 |
| 0° C. | — | 1.20 | — | 0.90 | 1.20 | 1.05 | — |
| −35° C. | — | 1.07 | — | 0.75 | 1.05 | 0.95 | — |
| 0° C. after 100 hr. | — | 1.10 | — | — | 0.60 | — | — |
| electrical resistance value | 0.3 MΩ | 0.3 MΩ | 0.4 MΩ | 0.2 MΩ | 0.3 MΩ | 0.4 MΩ | 0.2 MΩ |
| abrasion resistance | 0.02 mm | 0.02 mm | 0.02 mm | 0.02 mm | 0.02 mm | 0.02 mm | 0.02 mm |
| resistance to dirt | | | | | | | |
| (to 1,000 bill) | 100 | 100 | 100 | 100 | 100 | 30 | 100 |
| (to prepaid card) | 100 | 100 | 100 | 100 | 100 | 20 | 100 |
| (wet nylon canvas) | 100 | 100 | 100 | 100 | 100 | 120 | 100 |
| (dried nylon canvas) | 100 | 100 | 100 | 100 | 100 | 50 | 100 |
| adhesion resistance | 100 | 100 | 100 | 100 | 100 | 10 | 100 |
| brittleness temperature (rubber) | — | −40° C. | — | −34° C. | −38° C. | −54° C. | — |
| resistance to oil and water | see graph of FIG. 5 (good) inventive belts > comparative sample 3 > comparative sample 2 > comparative sample 4 > comparative sample 1 (bad) | | | | | | |
| number of times of drawing of card | — | 600 | — | 100 | 600 | — | — |

As shown in Table 3, with the inventive belt No. 2, the coefficient of friction decreased little at low temperatures. As seen particularly in comparing inventive belt No. 2 and the comparative sample No. 2, even if the inventive belt No. 2 is left at low temperatures for a long period of time, the coefficient of friction decreases little. This is believed to demonstrate the affect of the chloroprene rubber having the resistance to crystallization.

Further, the inventive belts Nos. 1–3 were superior in resistance to dirt adhesion, an effect believed attributable to the diatomaceous earth.

Furthermore, as shown in FIG. 2, with the inventive belt No. 2, even if the number of applications of the oil and water solution is increased, the frictional force is only minimally decreased, which is again believed to be attributable to the diatomaceous earth.

Figure 9:
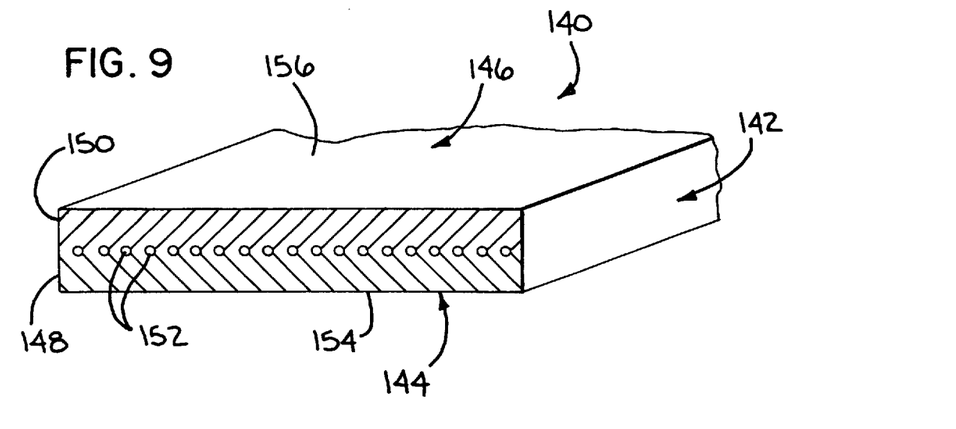
FIG. 9 is a fragmentary perspective view of another form of belt for conveying articles, according to the present invention.

In FIG. 9, a modified form of belt, according to the present invention, is shown at 140. The belt 140 has a body 142 with an inside and outside 144, 146, respectively, defined by rubber layers 148, 150. Longitudinally extending, load carrying cords 152 are embedded in and between the layers 148, 150. The layers 148, 150 are made from the same rubber composition as described for the belt 10. The layers 148, 150 have exposed, flat surfaces 154, 156, each of which can function as an article engaging surface. Filler is used as in the belt 10 in one or both of the rubber layers 148, 150. Essentially, the belt 140 is made, and functions, like the belt 10 without the need for driving/driven teeth.

The foregoing disclosure of specific embodiments is intended to be illustrative of the broad concepts comprehended by the invention.

We claim:

1. A belt for conveying articles, said belt comprising:

a body having a surface against which articles are placed to be frictionally held and thereby conveyed as the belt is advanced in operation, said belt body surface comprising rubber and a porous filler in the rubber, said porous filler comprises an inorganic porous powder selected from diatomaceous earth, zeolite, activated carbon or silica gel, wherein said belt body surface is formed by grinding.

2. The belt for conveying articles according to claim 1 wherein the porous filler is present in the rubber defining the belt body surface in an amount of no more than 80 parts by weight of porous filler per 100 parts by weight of rubber.

3. The belt for conveying articles according to claim 1 wherein the belt body has a length, and an inside and an outside, the surface against which articles are placed is on one of the inside and outside of the belt body and there are teeth spaced regularly in a lengthwise direction on the other one of the inside and outside of the belt body.

4. The belt for conveying articles according to claim 3 wherein there is a cloth layer on the teeth, said cloth layer comprising canvas treated only with a resorcinol-formalin-latex (RFL) solution.

5. The belt for conveying articles according to claim 1 wherein the rubber comprises chloroprene rubber having good resistance to crystallization.

6. The belt for conveying articles according to claim 3 wherein the teeth comprise rubber and the rubber defining the teeth and the belt body surface comprises chloroprene rubber having good resistance to crystallization.

7. The belt for conveying articles according to claim 3 wherein the belt body comprises a load carrying cord extending lengthwise over the entire length of the belt body.

8. The belt for conveying articles according to claim 1 wherein the rubber comprises a compound selected from chloroprene rubber, nitrile rubber, hydrogenated nitrile rubber, natural rubber, ethylene-propylene terpolymer (EPT), styrene-butadiene rubber, butyl rubber, and chlorosulfonated polyethylene rubber.

9. The belt for conveying articles according to claim 8 wherein the rubber comprises a compound selected from a) a compounding agent selected from carbon black, flowers of zinc, stearic acid, a plasticizer, or an antioxidant and b) a vulcanizing agent selected from sulfur or an organic peroxide.

10. The belt for conveying articles according to claim 1 wherein the porous filler comprises inorganic porous powder having particles with an average diameter of 10 $\mu$m–30 $\mu$m.

11. The belt for conveying articles according to claim 1 wherein the porous filler is present in the rubber defining the belt body surface in an amount of between 20–80 parts by weight of porous filler per 100 parts by weight of rubber.

12. The belt for conveying articles according to claim 1 wherein the grinding is performed by stretching the belt body, advancing the belt body, and grinding the belt body with the belt body stretched and advancing.

13. The belt for conveying articles according to claim 4 wherein the canvas treated with the RFL solution has a solid content of RFL of 30 to 50% by weight determined by the following formula: % solid content of RFL=(weight of canvas after treatment−weight of untreated canvas)/(weight of untreated canvas)×100(%).

14. The belt for conveying articles according to claim 7 wherein the load carrying cord comprises 5–9 $\mu$m filaments selected from E-glass or high strength glass treated with a material selected from an RFL solution or a rubber composition.

15. The belt for conveying articles according to claim 7 wherein the load carrying cord comprises 0.5–2.5 denier filaments of para-aramid fiber treated with a solution selected from an RFL solution, an epoxy solution, or an isocyanate solution and a rubber composition.

16. The belt for conveying articles according to claim 4 wherein the cloth layer comprises a textile selected from nylon 6, nylon 6,6, polyester, or aramid fiber.

17. The belt for conveying articles according to claim 4 wherein the cloth layer comprises a textile selected from a plain weave fabric, a twill fabric, or a satin fabric.

18. The belt for conveying articles according to claim 1 in combination with at least two spaced pulleys, wherein the belt is trained for advancement in a continuous path around the two pulleys.

19. The belt for conveying articles according to claim 18 in combination with a second belt comprising a second body having a second surface against which articles are placed to be frictionally held and thereby conveyed as the second belt is advanced in operation, said second belt body surface comprising rubber and a porous filler in the rubber, said porous filler being present in the rubber defining the second belt body surface in an amount of at least 5 parts by weight of porous filler per 100 parts by weight of rubber, and third and fourth pulleys around which the second belt is trained for advancement in a continuous path, said two spaced pulleys and third and fourth pulleys being arranged so that the belt body surfaces define a zone therebetween to accept flat articles that can be placed against the surfaces of the belt bodies to be frictionally held and thereby conveyed as the belts are advanced in the continuous paths.

20. A belt for conveying articles according to claim 1, wherein the porous filler is present in the rubber defining the belt body surface in an amount of at least 5 parts by weight of porous filler per 100 parts by weight of rubber.

21. A belt for conveying articles, said belt comprising:

a body having a length, an inside and an outside, there being a load carrying cord extending lengthwise over the entire length of the body, said body having a surface on one of the inside and outside of the body against which articles are placed to be frictionally held and thereby conveyed as the belt is advanced in operation, there being teeth on the other one of the inside and outside of the belt body spaced regularly along the length of the belt body, wherein there is a cloth layer on the teeth, said belt body comprising rubber that defines the belt body surface, there being a porous filler in the rubber that defines the belt body surface, said porous filler comprises an inorganic porous powder selected from diatomaceous earth, zeolite, activated carbon or silica gel, said belt body surface is formed by grinding.

22. The belt for conveying articles according to claim 21 wherein the porous filler is present in the rubber defining the belt body surface in an amount of no more than 80 parts by weight of porous filler per 100 parts by weight of rubber.

23. The belt for conveying articles according to claim 21 wherein the porous filler comprises inorganic porous powder having particles with an average diameter of 10 $\mu$m–30 $\mu$m.

24. The belt for conveying articles according to claim 21 wherein the porous filler is present in the rubber defining the belt body surface in an amount of between 20–80 parts by weight of porous filler per 100 parts by weight of rubber.

25. The belt for conveying articles according to claim 21 wherein the rubber comprises chloroprene rubber having good resistance to crystallization.

26. The belt for conveying articles according to claim 21 wherein the rubber comprises a rubber compound selected from chloroprene rubber, nitrile rubber, hydrogenated nitrile rubber, natural rubber, ethylene-propylene terpolymer (EPT), styrene-butadiene rubber, butyl rubber or chlorosulfonated polyethylene rubber.

27. A belt for conveying articles according to claim 21, wherein the porous filler is present in the rubber defining the belt body surface in an amount of at least 5 parts by weight of porous filler per 100 parts by weight of rubber.

28. A belt system for conveying articles, said belt system comprising:

a first belt comprising a first belt body having a first article conveying belt surface;

first and second spaced pulleys, about which the first belt is trained for advancement in a first continuous path;

a second belt comprising a second belt body having a second article conveying belt surface; and third and fourth spaced pulleys about which the second belt is trained for advancement in a second continuous path, said first and second belt surfaces being extended so that articles placed between the first and second belt surfaces are engaged by the first and second belt surfaces and conveyed as the belts are advanced in operation, said first and second belt surfaces comprising rubber and porous filler in the rubber, wherein the porous filler comprises an inorganic porous powder selected from diatomaceous earth, zeolite, activated carbon or silica gel.

29. A belt system according to claim 28, wherein said first and second belt body surfaces are formed by grinding.

30. The belt system according to claim 28, wherein the porous filler is present in the rubber defining the first and second belt body surfaces in an amount of at least 5 parts by weight of porous filler per 100 parts by weight of rubber.

31. The belt system according to claim 28, wherein the porous filler is present in the rubber defining the first and second belt body surfaces in an amount of no more than 80 parts by weight of porous filler per 100 parts by weight of rubber.

32. The belt system according to claim 28, wherein the first belt body has a first length, an inside and an outside, the first surface against which articles are placed is on one of the inside and outside of the first belt body and there are teeth spaced regularly in a lengthwise direction on the other one of the inside and outside of the first belt body, and wherein the second belt body has a second length, an inside and an outside, the second surface against which articles are placed is on one of the inside and outside of the second belt body and there are teeth spaced regularly in a lengthwise direction on the other one of the inside and outside of the second belt body.

33. The belt system according to claim 32, wherein there is a cloth layer on the teeth, said cloth layer comprising canvas treated only with a resorcinol-formalin-latex (RFL) solution.

34. The belt system according to claim 28, wherein the rubber comprises chloroprene rubber having good resistance to crystallization.

35. The belt system according to claim 32, wherein the teeth comprise rubber and the rubber defining the teeth and the first and second belt body surfaces comprise a chloroprene rubber having good resistance to crystallization.

36. The belt system according to claim 32, wherein the first and second belt bodies comprise a load carrying cord extending lengthwise over the entire first and second lengths of the first and second belt bodies.

37. The belt system according to claim 28, wherein the rubber comprises a compound selected from chloroprene rubber, nitrile rubber, hydrogenated nitrile rubber, natural rubber, ethylene-propylene terpolymer (EPT), styrene butadiene rubber, butyl rubber or chlorosulfonated polyethylene rubber.

38. The belt system according to claim 37 wherein the rubber comprises a compound selected from a) a compounding agent selected from carbon black, flowers of zinc, stearic acid, a plasticizer or an antioxidant or b) a vulcanizing agent selected from sulfur or an organic peroxide.

39. The belt system according to claim 28 wherein the porous filler comprises inorganic porous powder having particles with an average diameter of 10 $\mu$m–30 $\mu$m.

40. The belt system according to claim 28 wherein the porous filler is present in the rubber defining the belt body surface in an amount of between 20–80 parts by weight of porous filler per 100 parts by weight of rubber.

41. The belt system according to claim 28 wherein the grinding is performed by stretching the belt body, advancing the belt body, and grinding the belt body with the belt body stretched and advancing.

42. The belt system according to claim 33 wherein the canvas treated with the RFL solution has a solid content of RFL of 30–50% by weight determined by the following formula: % solid content of RLF (weight of canvas after treatment–weight of untreated canvas)/weight of untreated canvas)×100%.

43. The belt system according to claim 36 for conveying articles wherein the load carrying cord comprises 5–9 $\mu$m filaments selected from E-glass or high strength glass treated with a material selected from an RFL solution or a rubber composition.

44. The belt system according to claim 36 wherein the load carrying cord comprises 0.5–2.5 denier filaments of para-aramid fiber treated with a solution selected from an RFL solution, an epoxy solution or an isocyanate solution and a rubber composition.

45. The belt system according to claim 33 wherein the cloth layer comprises a textile selected from nylon 6, nylon 6,6, polyester or aramid fiber.

46. The belt system according to claim 33 wherein the cloth layer comprises a textile selected from a plain weave fabric, a twill fabric or a satin fabric.

* * * * *